United States Patent Office 3,272,650
Patented Sept. 13, 1966

3,272,650
PROCESS FOR CLEANING CONDUITS
Russell L. MacVittie, Marietta, Ohio, assignor to Union Carbide Corporation, a corporation of New York
No Drawing. Filed Feb. 21, 1963, Ser. No. 260,285
5 Claims. (Cl. 134—7)

This invention relates to a process for cleaning the interior surface of liquid carrying conduits and more particularly to cleaning the interior surface of tortuously shaped conduits.

Many liquids which are commonly transported through conduits contain solid matter in suspension or substances which may precipitate out of solution for various reasons. These solids have a tendency to adhere to the inner surface of the conduits through which the liquid is being transported and consequently the diameter of the conduit is reduced, thereby reducing the flow capacity of the conduit. In addition, these solids are usually poor conductors of heat and when the conduit is also intended to be a heat transfer member, its efficiency in this regard is likewise impaired.

A common method of removing such adhering solids is to force a member of approximately the same diameter as the conduit through the conduit and thereby actually scrape the deposits from the interior of the conduit. This approach is successful with relatively straight conduits. However, with a tortuously shaped conduit, for example, one having many short radius bends, such an approach is unsatisfactory.

Accordingly, it is the principal object of this invention to provide a process for removing any adherent deposits from the interior surface of a conduit, irrespective of the configuration of the conduit.

Broadly stated, the object of this invention is accomplished by forming a suspension of irregular shaped particles of an inert organic material, such as resins or plastics, in a suspending liquid, the ratio of particles to liquid being in the range of 0.4 to 0.6 pound per gallon, and passing the suspension at a lineal velocity sufficient to provide turbulent flow in the particular conduit to be cleaned, through the interior of the conduit until the adherent deposit is removed.

The particular organic resin or plastic employed is relatively unimportant except insofar as it relates to the desired properties of inertness with respect to the suspending liquid, and its density and hardness.

The density of the particles should be between 80 and 120 percent of the suspending liquid. The density of the selected particles in relation to the suspending liquid is important in that the particles must be carried by the suspending liquid with a minimum tendency to separate or settle out. If the density of the particles differ in too great a degree from that of the suspending liquid there may be a tendency of the particles to accumulate within the conduit system at points of abrupt change in diameter or configuration.

In the preferred embodiment of the process, the density of the selected particles are in the range of ±5 to ±10 percent of the suspending liquid. Comparatively speaking, when higher velocity flows are employed, density differences up to ±20 percent of the suspending liquid are suitable.

The hardness of the selected particles should be within the range of 60 to 120 Rockwell M. The hardness of an otherwise suitable material may be brought within the desired range by incorporating suitable fillers in the material, such as silica, carborumdum and the like. Likewise, the density of the selected material may be regulated as desired by the incorporation of similar fillers or by foaming the material.

The suspending liquid which is employed to carry the irregular particles may be any which is compatible with the liquid which is normally transported in the conduit to be cleaned. In addition, the liquid must not react with or dissolve the suspended particles and should have a viscosity such that the movement of the particles are not impeded.

Generally, water is the preferred suspending liquid. Among the many suitable inert materials for use with water, are styrene-acrylonitrile copolymers containing 10 to 30 percent acrylontrile, methyl methacrylates, polycarbonates, and nylons.

In the practice of the invention the resins or plastic material is initially prepared or obtained in a form such as rods or sheets which may be easily crushed to form irregular pieces having sharp corners at surfaces intersections.

For best results, it has been determined that the size of the particles should be within the range of $\frac{1}{10}$ to $\frac{1}{30}$ and preferably $\frac{1}{14}$ to $\frac{1}{18}$ of the internal diameter of the conduit to be cleaned.

In the actual practice of the process of the invention, the flow of the regular liquid through the conduit to be cleaned is stopped and, if necessary the system is drained, and connection is made to an appropriate pump and to the supply tank in which the suspension of inert, irregular particles has been prepared. The exit end of the conduit system may be returned to the same tank so that the suspension may be recirculated, or if preferred, to a separate tank. If recirculation of the adherent deposits which are removed from the conduit by the process of the invention, is undesirable, the suspension exiting from the conduit should be passed through a screen with openings of a size which will retain the inert particles but allow the removed deposits, which are generally more finely divided, and the carrying liquid to pass through. The liquid may then be filtered for reuse if desired, or discarded. Similarly, the particles retained on the screen may be reused by adding them to a new or recovered supply of the suspending liquid.

The pressure required to force the suspension through the conduit to be cleaned will, of course, depend on the geometry of the particular conduit system, and may vary widely, but should be sufficient to produce turbulent flow for optimum cleaning effect and maximum efficiency. Turbulent flow ensures frequent, forceful, impact of the irregular particles against the inner surface of the conduit. The minimum velocity required to produce turbulent flow in any given conduit system can be determined by those skilled in the art by any one of several known formulae, that of Reynolds being frequently used. In a straight, circular cross-section conduit of considerable length, turbulent flow will usually occur with values of the Reynolds number in excess of about 2000. The onset of turbulent flow will vary depending on the configuration of the conduit system being cleaned, but in general for the purposes of this invention, the flow rate should be such as to result in a Reynolds number greater than 2000. A flow rate of between 100 and 700 linear feet per minute of the suspension is usually sufficient to give the desired results. Flow rates less than this may be employed but since the impact velocity of the irregular particles will be decreased appreciably, the cleaning effect is seriously diminished, and the time inordinately increased. Likewise, velocities above 700 lineal feet per minute may be used, but the pumping energy required becomes excessive in relation to the saving in cleaning time.

The method of the invention will be more clearly understood from the following examples.

Example I

The method of the invention was applied to cooling coils which were employed to extract heat from a system and maintain the temperature at the desired maximum level. The cooling coils were constructed from lead pipe 1⅛ inches inside diameter and approximately 140 feet long, wound in the form of an approximately rectangular, flat spiral. Five such spirals were connected to a common header at each end. A suspension of 0.52 pound per gallon of suspending media of a 28 percent styrene-acrylonitrile resin having density of 1.07 to 1.085 g./cm.³ and a hardness of 80–85 Rockwell M was prepared using water as the suspending media. The resin was in the form of irregular particles weighing about 5 to 20 mg. each. The particles were broken sections of rods which had an ellipsoidal cross section measuring about 3/32 of an inch by ⅛ of an inch, and the particles were in lengths of about ⅛ inch or less. The suspension was passed through the coils at the rate of 15 gallons per minute (about 290 lineal feet per minute) for 10 minutes. The suspension was recycled without separation of the removed deposits. At the end of the operation, the suspension was passed through a 20 mesh screen (Tyler series) to separate the resin particles from the water and the removed deposits. The deposit in the pipe which appeared to be a mixture of silt and organics about ⅛ inch in radial thickness was completely removed without damage to the lead pipe.

Example II

The method of the invention was applied to coils prepared from straight lengths of carbon pipe with carbon headers at each end. The pipe was 1½ inches inside diameter, and each section was about 8 feet 6 inches long. There were ten sections mounted in two rows of five each between the two headers in each complete assembly.

The suspension of Example I was passed through each assembly again at a rate of 15 gallons per minute, the lineal velocity being about 160 feet per minute. Complete cleaning was accomplished in about ten minutes without damage to the carbon pipe or headers. The resin particles were recovered for reuse as in Example I.

As may be seen from the examples and description, the method of the invention is effective in cleaning the interior of conduits used for transporting liquids and is particularly well adapted to cleaning of conduits made of relatively soft materials.

I claim:

1. A process for cleaning adhering deposits from the interior surface of a conduit, said process comprising preparing a suspension consisting essentially of water and irregularly shaped particles having sharp corners at surface intersections, said particles being of an organic material chosen from the group consisting of styrene-acrylonitrile copolymers containing 10 to 30 percent acrylonitrile, methyl methacrylates, polycarbonates and nylons, the ratio of particles to water being in the range of 0.4 to 0.6 pound per gallon and said particles and said water being respectively inert to one another and mutually insoluble; said particles being further characterized by having a density of between 80 percent and 120 percent of said water, a hardness within the range of 60 to 120 Rockwell M and a size in the range of from 1/10 to 1/30 of the internal diameter of said conduit to be cleaned; and passing said suspension through the interior of said conduit to be cleaned at a lineal velocity sufficient to provide turbulent flow in said conduit, and for a time sufficient to remove said adherent deposits.

2. The process of claim 1 wherein said irregular particles are of a size in the range of from 1/14 to 1/18 of the internal diameter of said conduit to be cleaned.

3. The process of claim 1 wherein said flow of said suspension through said conduit is characterized by a Reynolds number of at least 2000.

4. The process of claim 1 wherein said flow rate of said suspension through said conduit is between about 100 to 700 linear feet per minute.

5. The process of claim 4 wherein said irregular particles are styrene-acrylonitrile copolymers containing 10 to 30 percent acrylonitrile.

References Cited by the Examiner

UNITED STATES PATENTS

| | | | |
|---|---|---|---|
| 1,795,348 | 3/1931 | Schmidt | 15—3.5 X |
| 2,426,072 | 8/1947 | Wall et al. | 51—320 |
| 2,801,824 | 8/1957 | Taprogge | 15—3.51 X |
| 3,021,546 | 2/1962 | Walz | 15—3.51 |
| 3,072,503 | 1/1963 | Baum | 134—8 |

MORRIS O. WOLK, *Primary Examiner.*

JOSEPH SCOVRONEK, *Examiner.*

J. ZATARGA, *Assistant Examiner.*